J. B. BAILEY.
WRENCH.
APPLICATION FILED AUG. 29, 1917.
1,268,538.
Patented June 4, 1918.
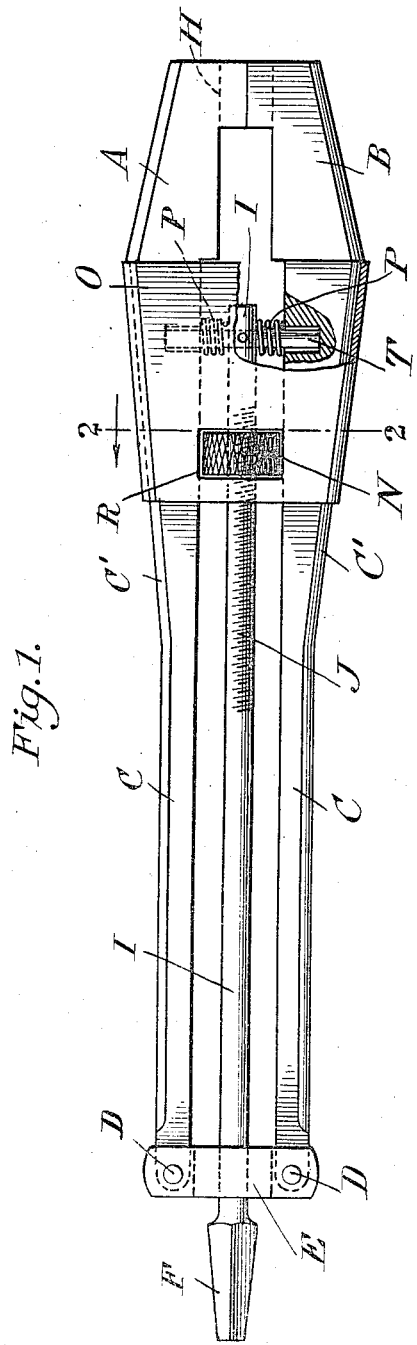
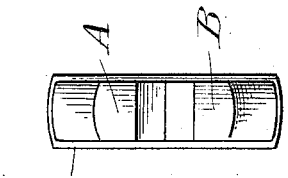
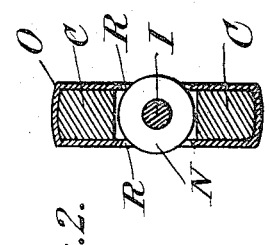
Witness
Fenton S. Belt
A. L. Hough
Inventor
James B. Bailey
By Franklin N. Hough
Attorney

UNITED STATES PATENT OFFICE.

JAMES BUNYAN BAILEY, OF KNOXVILLE, TENNESSEE.

WRENCH.

1,268,538.  Specification of Letters Patent.  Patented June 4, 1918.

Application filed August 29, 1917. Serial No. 188,793.

*To all whom it may concern:*

Be it known that JAMES B. BAILEY, a citizen of the United States, residing at Knoxville, in the county of Knox and State of Tennessee, has invented certain new and useful Improvements in Wrenches; and he does hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in tilting bevel wrenches, and consists of a simple and efficient device of this nature having various details of construction, combinations and arrangements of parts which will be hereinafter fully described, shown in the accompanying drawings and then specifically defined in the appended claims.

My invention is illustrated in the accompanying drawings in which:

Figure 1 is a side elevation of a wrench, made in accordance with my invention.

Fig. 2 is a sectional view on line 2—2 of Fig. 1.

Fig. 3 is an end view, and

Figs. 4 and 5 are detailed views of slightly modified forms of the jaws of the wrench.

Reference now being had to the details of the drawings by letter:

A and B designate two jaws of the wrench having shank portions C which are pivotally mounted upon the pins D' carried by the plug E having a shank portion F adapted to engage a bit socket. The outer portions of the shank portions of the jaws are inclined as at C' to coöperate with a sleeve for adjustment of the jaws. Said jaws have angled recesses H at their adjacent faces, as shown in Fig. 3 and are adapted to grip an object. The rod I projects from said plug and is circumferentially threaded as at J and upon the threaded portion of the rod a circumferential milled nut N is mounted.

A tapering sleeve O is mounted over the shank portion of the jaws and is provided with oppositely disposed openings R therein through which said nut passes. A pin T passes through an aperture in the rod I and is mounted in the registering holes formed in the center faces of the shank portions of the jaws and serves as a means for guiding the jaws as they open and close. Springs P are mounted upon said pin and bear intermediate the rod and the adjacent faces of the jaws C and tend to normally throw the same away from each other as the sleeve is moved in one direction.

In Figs. 4 and 5 of the drawings I have shown the shapes of the jaws differing somewhat from the illustration in Fig. 3 of the drawings.

In operation, it will be noted that when the nut N is rotating toward the jaws the sleeve will be moved forward and the inclined faces of the sleeve coming in contact with the inclined or tapering edges C' of the shank portion of the jaws, the latter will be moved toward each other, thus adjusting the jaws to grip different sized objects. When the nut is turned in the reverse direction the sleeve will be moved away from the jaws and the springs will throw the jaws away from each other.

What I claim to be new is:

1. A wrench comprising a member, two jaws having shank portions pivoted thereto, a threaded rod fixed to and projecting from said member intermediate the shank portions of the jaws, a sleeve with openings therein and mounted over the shank portions of the jaws, a nut mounted upon the threaded portion of said rod and extending through said opening in the sleeve, means for guiding the jaws as they open and close, and a spring for separating the jaws as the sleeve is moved in one direction.

2. A wrench comprising a member having a shank portion adapted to engage a bit socket, two jaws having shank portions pivoted to said member, portions of the outer faces of the two shank portions of the jaws being inclined, a sleeve having opposite sides inclined and engaging over the inclined portions of the shanks of the jaws, the opposite faces of the sleeve being provided with openings, a threaded apertured rod fixed to said member and positioned between the shank portions of the jaws, a nut fitted upon the threaded portion of the rod and engaging said openings, a pin passing through the aperture of the rod and engaging holes in the inner faces of the shank portions of the jaws, and springs upon the pin bearing between the rod and the jaws.

JAMES BUNYAN BAILEY.

Witnesses:
JOHN W. ANDES,
JOHN C. WARWICK.